United States Patent
Bohn et al.

[19]

[11] Patent Number: 6,002,124
[45] Date of Patent: Dec. 14, 1999

[54] PORTABLE IMAGE SCANNER WITH OPTICAL POSITION SENSORS

[75] Inventors: David D. Bohn, Fort Collins; Dan L. Dalton, Greeley, both of Colo.

[73] Assignee: Hewlett-Packard Company, Palo Alto, Calif.

[21] Appl. No.: 09/045,603

[22] Filed: Mar. 20, 1998

[51] Int. Cl.⁶ ...................................................... H01J 40/14
[52] U.S. Cl. .................. 250/208.1; 358/473; 235/462.13
[58] Field of Search ................................. 250/214 A, 221, 250/208.1, 234–236, 566, 556, 557, 559.29; 356/375; 358/473, 474, 482, 483, 493, 494, 497, 498; 235/462.13, 462.46

[56] References Cited

U.S. PATENT DOCUMENTS

| | | | |
|---|---|---|---|
| 5,089,712 | 2/1992 | Holland | 250/557 |
| 5,297,762 | 3/1994 | Muranaka | 250/203.3 |
| 5,306,908 | 4/1994 | McConica et al. | 250/234 |
| 5,381,020 | 1/1995 | Kochis et al. | 250/566 |
| 5,424,524 | 6/1995 | Ruppert et al. | 235/383 |
| 5,537,228 | 7/1996 | Dillinger | 358/505 |
| 5,552,597 | 9/1996 | McConica | 250/234 |
| 5,578,813 | 11/1996 | Allen et al. | 250/208.1 |
| 5,586,212 | 12/1996 | McConica et al. | 250/234 |
| 5,703,353 | 12/1997 | Blalock et al. | 250/214 A |
| 5,729,008 | 3/1998 | Blalock et al. | 358/497 |
| 5,825,044 | 10/1998 | Allen et al. | 250/208.1 |

Primary Examiner—Stephone Allen

[57] ABSTRACT

An imaging device may comprise an image head having an elongate slot therein with first and second lengthwise ends. The image head may also include a first navigation sensor aperture and a second navigation sensor aperture positioned adjacent the elongate slot at positions other than positions that are aligned with the first and second lengthwise ends of the elongate slot. An image sensing system optically aligned with the elongate slot in the image head is responsive to image light passing through the elongate slot and produces an image signal based on the image light. A first navigation sensor optically aligned with the first navigation sensor aperture in the image head is responsive to first navigation light passing through the first navigation sensor aperture and produces a first navigation data signal based on the first navigation light. A second navigation sensor optically aligned with the second navigation sensor aperture in the image head is responsive to second navigation light passing through the second navigation sensor aperture and produces a second navigation data signal based on the second navigation light.

15 Claims, 4 Drawing Sheets

PORTABLE IMAGE SCANNER WITH OPTICAL POSITION SENSORS

FIELD OF THE INVENTION

This invention relates to hand-held imaging devices in general and more specifically to hand-held imaging devices having "navigation" systems for determining the position of the hand-held imaging device with respect to the object being imaged.

BACKGROUND

Imaging devices, such as optical scanners, are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" or CIS may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

One type of hand-held scanner device may include a position sensing or "navigation" system for determining the position of the hand-held scanner with respect to the object being scanned. Essentially, such position sensing systems allow the scanner to correlate its position with respect to the object being scanned. The position correlation allows a complete image of the scanned object to be produced even though the scanner may not scan the entire object during a single pass or "swipe." For example, if two or more swipes of the object are required to scan the entire object, then the position correlation provided by the navigation system will allow the various portions of the scanned image data to be "stitched" together to form a single unitary image representative of the entire scanned object.

One type of navigation system utilizes a pair of optical sensors to detect certain inherent structural features (e.g., surface roughness, paper fiber orientation, etc.) contained on the object being scanned (e.g., a sheet of paper with text or images thereon). Examples of the foregoing type of navigation system are disclosed in U.S. Pat. No. 5,089,712 of Holland for "Sheet Advancement Control System Detecting Fiber Pattern of Sheet," and U.S. Pat. No. 5,578,813 of Allen, et al., for "Freehand Image Scanning Device which Compensates for Non-Linear Movement," both of which are specifically incorporated herein by reference for all that they disclose.

While such navigation systems are known and are being used, they are not without their disadvantages. For example, significant problems can arise if the user is careless with the operation of the scanner and allows one or more of the navigation sensors to move past the edge of the object (e.g., document) being scanned. If this happens, the navigation system will lose track of its position, which usually prevents the image processing system from properly stitching together the various image portions to form a whole. Another problem associated with navigation systems of the type described above is that it is often difficult for the user to ascertain precisely the location of the bounds of the scan line due to the positions of the optical navigation sensors, which are located at either end of the scan line. Consequently, the user often times fails to provide sufficient overlap of the scanning swipes, which again, can make it difficult or impossible for the scanner control system to stitch together the various image portions to form the unitary whole.

Consequently, a need exists for hand-held imaging device having a navigation system that does not suffer from the disadvantages associated with currently existing navigation systems.

SUMMARY OF THE INVENTION

An imaging device may comprise an image head having an elongate slot therein with first and second lengthwise ends. The image head may also include a first navigation sensor aperture and a second navigation sensor aperture positioned adjacent the elongate slot at positions other than positions that are aligned with the first and second lengthwise ends of the elongate slot. An image sensing system optically aligned with the elongate slot in the image head is responsive to image light passing through the elongate slot and produces an image signal based on the image light. A first navigation sensor optically aligned with the first navigation sensor aperture in the image head is responsive to first navigation light passing through the first navigation sensor aperture and produces a first navigation data signal based on the first navigation light. A second navigation sensor optically aligned with the second navigation sensor aperture in the image head is responsive to second navigation light passing through the second navigation sensor aperture and produces a second navigation data signal based on the second navigation light.

Also disclosed is a method for calculating a spaced-distance separating the first and second navigation areas. The method comprises the steps of: selecting a maximum navigation offset; determining a radius of a navigation error circle associated with a first navigation area; and selecting the spaced-distance separating the first and second navigation areas to be about equal to or greater than the product of the length of the elongate scan line and the radius of the first navigation error circle divided by the maximum navigation offset.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
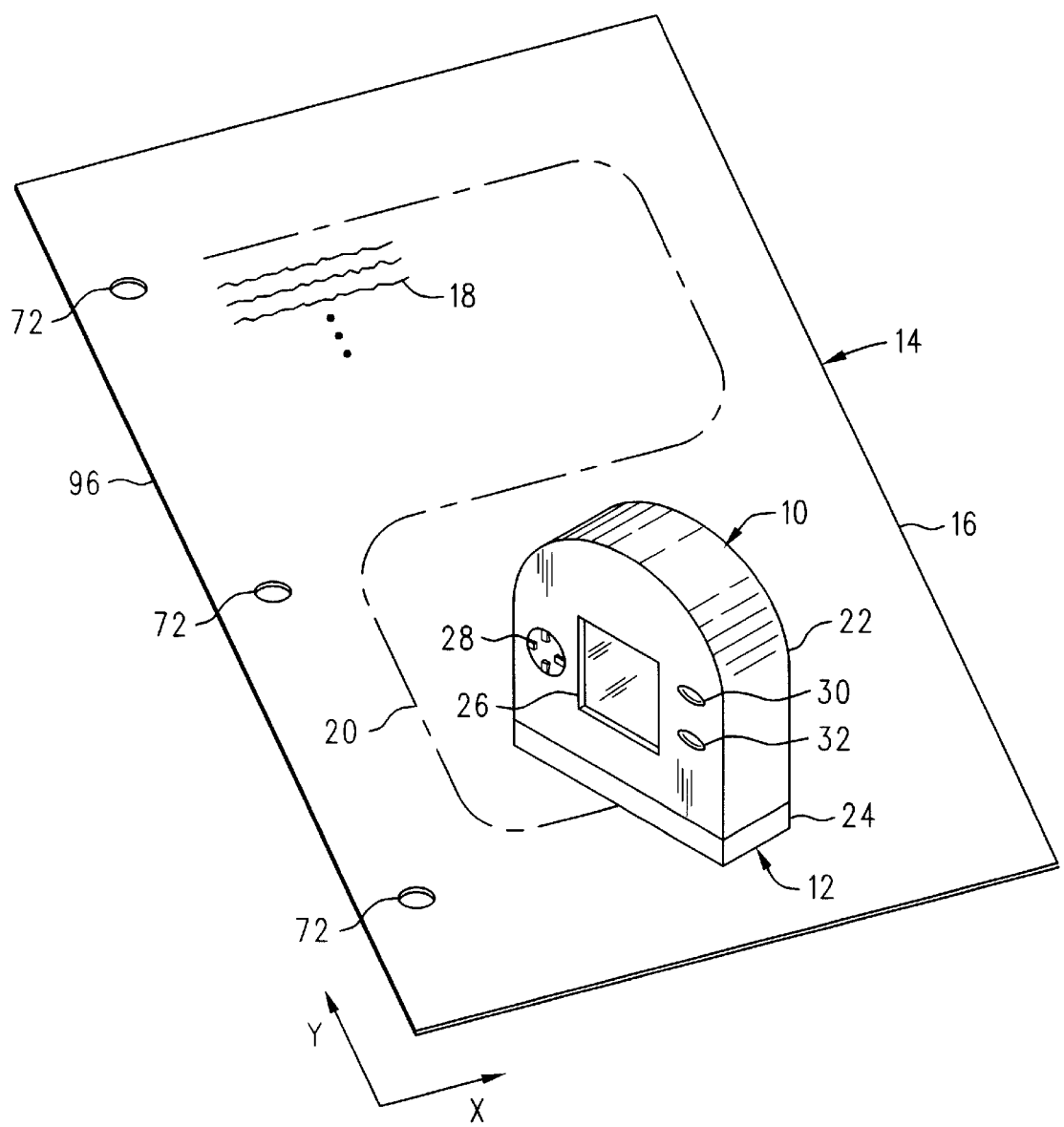
FIG. 1 is a perspective view of a portable image scanner having an optical positioning system according to the present invention.

A portable image scanner 10 having a navigation system 12 is shown in FIG. 1 as it could be used to scan an object 14, such as a document 16 with written text 18 provided thereon. As will be explained in greater detail below, the navigation system 12 associated with the portable image scanner 10 allows the scanner 10 to scan documents of nearly any size, regardless of the size of the portable image scanner 10. For example, in the application illustrated in FIG. 1, the entire document 16 may be scanned by moving the portable image scanner 10 over the document 16 along a meandering or curvilinear scanning path 20. The meandering or curvilinear scanning path 20 may be thought of as defining one or more scanning passes or "swipes." Image data representative of the entirety of the scanned document 16 may then be obtained by stitching together the various image data pieces acquired by the scanner 10 during each swipe of the document 16. The various image data pieces are stitched together based on position or navigation information provided by the navigation system 12.

Figure 2:
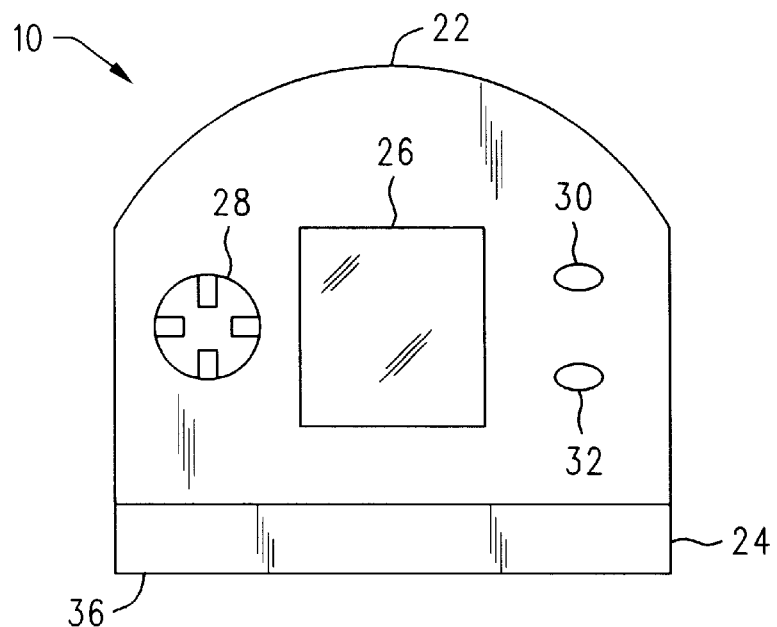
FIG. 2 is a front view in elevation of the portable image scanner shown in FIG. 1.
Figure 3:
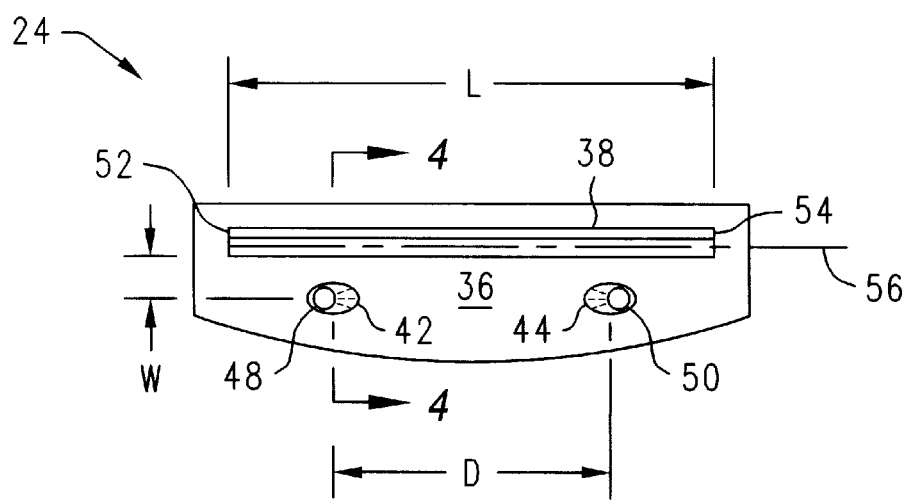
FIG. 3 is an elevation view of the contact surface of the image head of the portable image scanner showing the position of the two navigation apertures.
Figure 4:
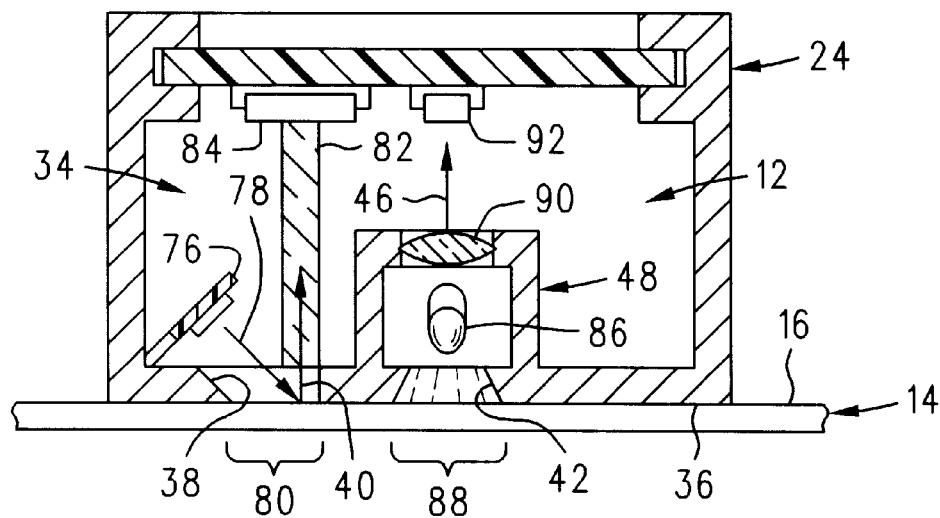
FIG. 4 is a cross-section view in elevation of the image head of the portable image scanner taken along the line 4—4 of FIG. 3.

Referring now primarily to FIGS. 2–4, the portable image scanner 10 may comprise a main body portion 22 having an image head portion 24 associated therewith. In one embodiment, the image head portion 24 may comprise a separate component that is attached to the main body 22. The main body 22 of portable image scanner 10 may be sized to receive the various electronic components and other devices (not shown) required for the operation of the portable image scanner 10. For example, in addition to housing the various electronic components (not shown) required for the operation of the portable image scanner 10, the main body portion 22 may also be provided with a display device 26 and various buttons or switches 28, 30, and 32, to control the function and operation of the image scanner 10. The main body 22 may also be sized to receive a suitable power source, such as a battery (not shown), for providing electrical power to the portable image scanner 10.

The image head portion 24 of portable image scanner 10 may be configured to receive an image sensing system 34 and the navigation system 12, as best seen in FIG. 4. The face or contact surface 36 (FIG. 3) of the image head portion 24 may be provided with an elongate aperture or slot 38 therein which allows image light 40 reflected by the illuminated scan region 80 (FIG. 4) on the object 14 being scanned to be received by the image sensing system 34. The image sensing system 34 produces an image signal (not shown) based on the image light 40. Image data contained in the image signal (not shown) may then be processed or manipulated by an image processing system (not shown) to produce image data that is representative of the object 14.

As mentioned above, the image head portion 24 may also be provided with a navigation system 12 which produces a navigation data signal (not shown) indicative of the position of the portable image scanner 10 with respect to the object 14 being scanned. The navigation data signal (not shown) produced by the navigation system 12 may be used by the image processing system (not shown) as a guide to stitch together the image data contained in the image signals acquired during the various swipes to form image data that is representative of the entirety of the scanned object 14. In one preferred embodiment, the navigation system 12 may comprise a navigation system of the type shown and described in U.S. Pat. No. 5,578,813 of Allen et al. for "Freehand Image Scanning Device which Compensates for Non-Linear Movement" which is hereby incorporated by reference for all that it discloses.

Referring specifically now to FIGS. 3 and 4, the navigation system 12 may include first and second navigation sensor apertures 42 and 44 and first and second navigation sensors 48 and 50. As used herein, the term "aperture" refers to a hole or opening in the contact face 36 of the image head portion 24 through which navigation light passes. The navigation sensor apertures 42 and 44 define respective navigation areas (e.g., navigation area 88 shown in FIG. 4) on the object 14 being scanned and allow navigation light 46 reflected by the navigation area (e.g., area 88) on the object 14 to be received by the respective first and second navigation sensors 48 and 50. The first and second navigation sensors 48 and 50 produce respective first and second navigation data signals that are indicative of the position of the portable image scanner 10 with respect to the object 14 being scanned.

The navigation system 12 utilized in one preferred embodiment of the present invention differs from the navigation system shown and described in the above-referenced U.S. Pat. No. 5,578,813 in that navigation sensor apertures 42 and 44 are positioned so that the navigation areas defined thereby are not generally aligned with the elongate scan line. Instead, the navigation system 12 utilized in the present invention is configured so that the navigation areas (e.g., navigation area 88) that are sensed by the navigation sensors 48, 50 are located at positions other than positions that are aligned with the elongate scan line. While it was thought to be generally advantageous to locate the navigation areas at either end of the elongate scan line, as is illustrated in U.S. Pat. No. 5,578,813, it has been discovered that this need not be the case and that the navigation areas may be placed at locations other than locations that are adjacent either end of the scan line so long as certain factors are considered and accounted for, as will be explained below.

Referring specifically now to FIG. 3, the navigation sensor apertures 42 and 44 may be laterally displaced from the axis 56 connecting the first and second lengthwise ends 52 and 54 of the elongate slot 38 by a distance W. The navigation sensor apertures 42 and 44 may also be moved together somewhat so that they are separated by a spaced-distance D that is generally less than the length L of the elongate scan line 58 (FIG. 5) defined by the elongate slot 38. Accordingly, unlike the configuration shown and described in U.S. Pat. No. 5,578,813, the navigation sensing areas (e.g., sensing area 88) sensed by the first and second navigation sensors 48 and 50 are not located at positions that are generally aligned with the first and second lengthwise ends 52 and 54 of the elongate slot 38.

In one preferred embodiment, the first and second navigation sensors 48 and 50 are essentially aligned with the first and second apertures 42 and 44. See FIG. 4. Consequently, the first and second navigation sensors 48 and 50 may be thought of as being positioned at approximately the same locations as the first and second apertures 42 and 44, respectively, at least with regard to the spaced-distance D and the lateral distance W. However, as will be discussed in greater detail below, this need not necessarily be the case if an optical coupling system (e.g., a fiber optic light transmission system, a light pipe, or a mirror system) is used to transmit navigation light 46 to the various navigation sensors 48 and 50. If such an optical coupling system is used, the first and second navigation sensors 48 and 50 may be placed at any convenient locations within the image head 24. Alternatively, the first and second navigation sensors 48 and 50 may even be placed within the main body portion 22 of the portable image scanner 10.

In accordance with the foregoing considerations, it should be noted that the terms "location" or "position," when used in the context of the first and second navigation sensors 48 and 50, refer to the locations of the respective sensing areas (e.g., sensing area 88) monitored by the sensors 48 and 50, and not necessarily the locations of the actual navigation sensors 48 and 50. That is, it is the locations of the sensing areas that are detected or monitored by the navigation sensors 48 and 50 that are important in achieving the objects and advantages of the present invention and not necessarily the locations of the navigation sensors 48 and 50 themselves. In one preferred embodiment, the sensing areas (e.g., sensing area 88) are defined by the first and second apertures 42 and 44.

Figure 5:
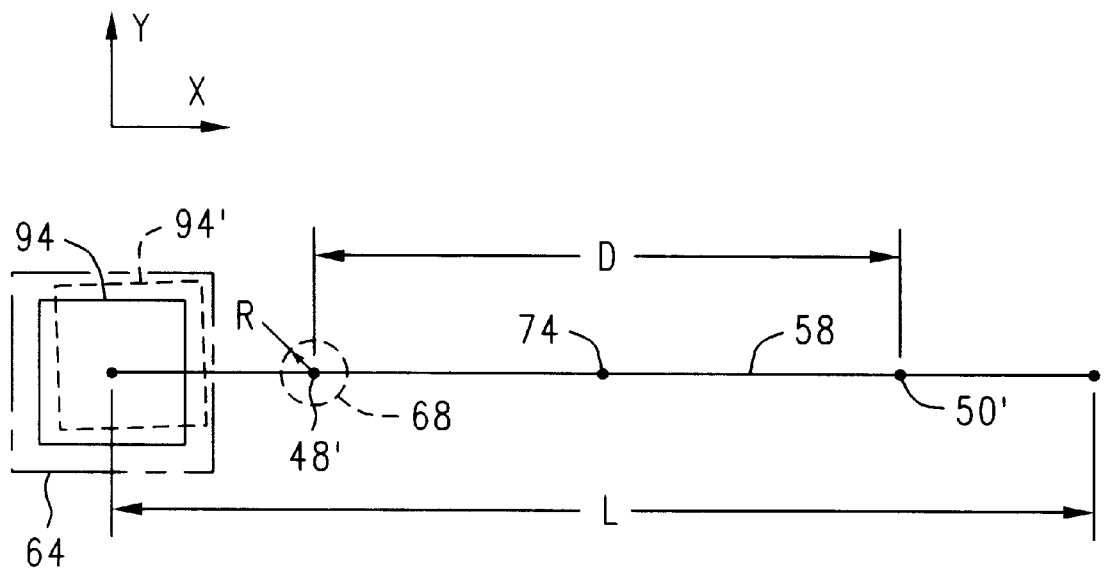
FIG. 5 is a schematic representation of the scan line and navigation sensor geometry that may be used to determine a spaced-distance separating two navigation areas.
Figure 6:
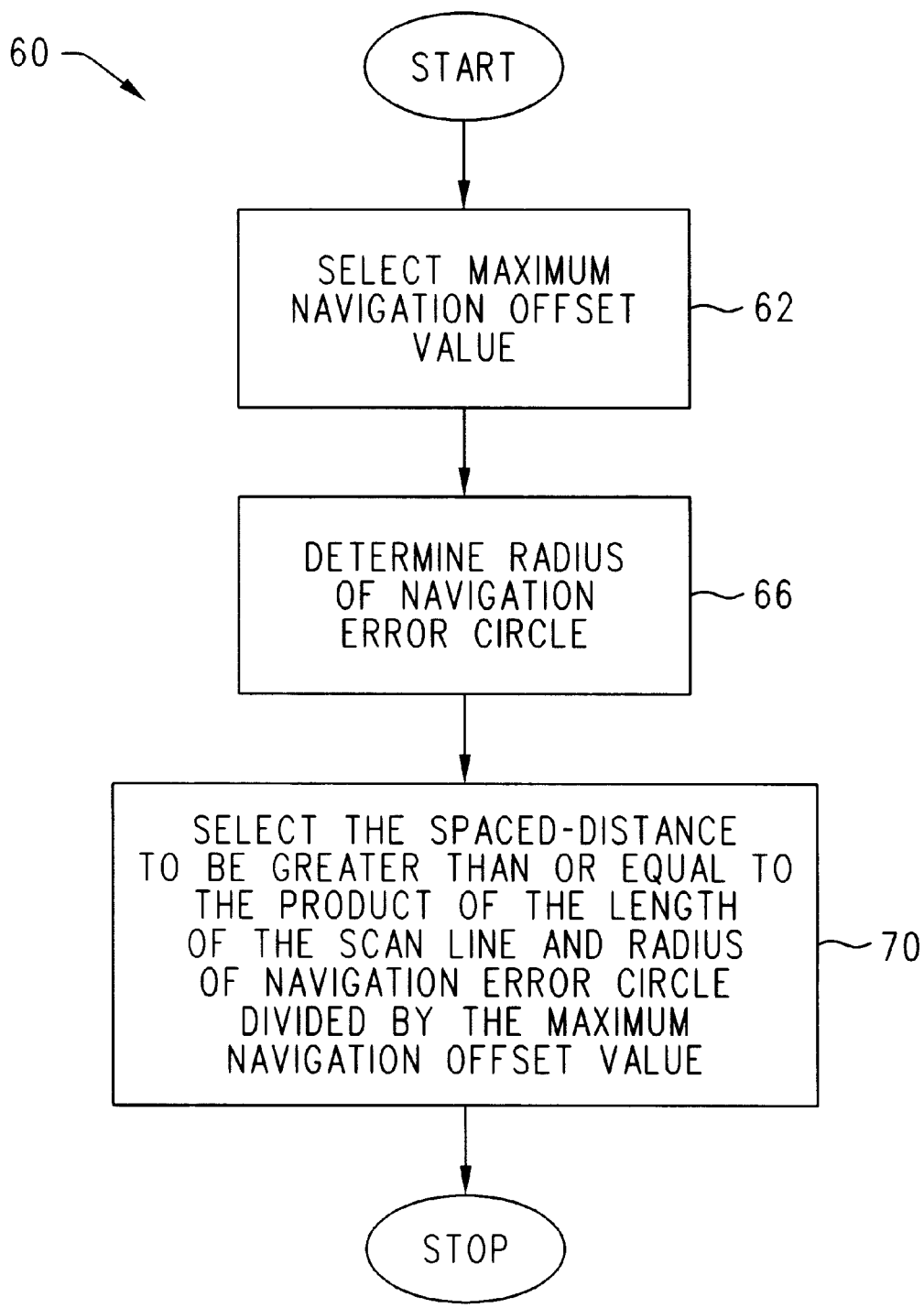
FIG. 6 is a flow diagram illustrating the method according to the present invention for determining the spaced-distance separating the navigation sensors.

A method 60 for determining the spaced-distance D separating the navigation sensors 48 and 50 (i.e., the first and second navigation areas) is best understood by referring to FIGS. 5 and 6. Essentially, FIG. 5 is a schematic representation of a scan line 58 "sensed" or detected by the imaging system 34 contained in the image head 24. The scan line 58 has a length L that is essentially identical to the length L of the elongate slot 38 in the contact face 36 of the image head 24. Actually, in most practical applications the length of the elongate slot 38 will be slightly longer than the length L of the scan line 58 to ensure that the entirety of the scan line L is detected by the imaging system 34. Accordingly, as used herein, the length L refers to the length of the scan line 58, as opposed to the length of the elongate slot 38, which may be somewhat longer. Also, for convenience in explaining the method 60 of determining the spaced-distance D separating the navigation sensors 48 and 50, the first and second navigation sensors 48 and 50 may be regarded as being located at respective positions 48' and 50' on scan line 58, as shown in FIG. 5. However, in practice, the first and second navigation sensors 48 and 50 are displaced from the scan line 58 by a lateral distance W (FIG. 3), as will be explained in greater detail below.

The first step 62 in the method 60 for determining the spaced-distance D is to select a maximum navigation offset value. As will be explained in greater detail below, the maximum navigation offset value is used by the image processing system (not shown) to stitch together the image data collected during the various "swipes" of the portable image scanner 10 as it is moved along the meandering or curvilinear scanning path 20 (FIG. 1). The maximum navigation offset value may be expressed in units of pixels, although conventional length units (e.g., millimeters, microns, etc.) may also be used.

The next step 66 in the method 60 is to determine a radius R of a navigation error circle 68 associated with each navigation sensor 48 and 50. Essentially, the navigation error circle 68 represents the position error likely to be expected based on a predetermined displacement of the portable image scanner 10 across the object 14. The radius R of the navigation error circle 68 may be in units of pixels, although conventional length units may also be used.

The spaced-distance D separating the two navigation sensors 48 and 50 is then calculated at step 70. Essentially, the spaced-distance D should be selected so that it is about equal to or greater than the product of the length L of the elongate scan line 58 and the radius R of the navigation error circle 68 divided by the maximum navigation offset value. Expressed mathematically:

$$D \geq \frac{LR}{\text{Max. Navigation Offset Value}}$$

Another consideration in locating the first and second navigation sensors 48 and 50 relates to the positions of any "non-navigable" artifacts likely to be encountered on the object 14 being scanned. For example, if the object 14 most likely to be scanned comprises a document 16 having a plurality of holes 72 contained in the left-hand margin, such as the type commonly used to allow the document 16 to be held by a 3-ring binder, then it is preferable that the navigation sensors 48 and 50 be located so that they are not likely to pass over such holes 72 during normally expected scanning swipes. As will be explained in greater detail below, the calculated spaced-distance D is generally sufficient to locate the first and second navigation sensors 48 and 50 at positions so that they are not likely to pass over such holes 72 when the first and second navigation sensors 48 and 50 are centered with respect to the center point 74 of the scan line 58. See FIG. 5.

The portable image scanner 10 may be operated as follows to scan an object 14, such as a document 16 with written text 18 thereon. As a first step, the user (not shown) would set-up or initialize the portable image scanner 10 to perform the scanning operation by actuating the appropriate buttons or switches (e.g., 28, 30, and 32) in accordance with the particular operational sequence for the specific scanner device 10. The user may then place the contact surface or face 36 of the scanner 10 against the document 16 and initiate the scanning operation. In order to capture the entire contents of the document 16, the user may deem it necessary to move the portable image scanner 10 over the document 16 in a meandering or curvilinear scanning path 20. The meandering or curvilinear scanning path 20 may define one or more scanning "swipes." The image data produced by the imaging sensing system 34 on each of the scanning swipes may be "tagged" with corresponding navigation or position data to form "position tagged" image data. The position tagged image data may thereafter be stitched together by the image processing system (not shown) to form combined image data that is representative of the entirety of the scanned document 16.

A significant advantage of the present invention is that the location and spacing of the navigation sensor apertures 42 and 44 are such that the navigation areas (e.g., area 88) sensed by the navigation sensors 48, 50 minimizes the chances that either one or both of the navigation sensors 48, 50 will lose navigational contact with the object 14 being scanned. For example, if the object 14 being scanned comprises a document 16 with written text 18 printed thereon, the location and spacing of the navigation sensor apertures 42 and 44 substantially reduces the likelihood that the user will inadvertently move the portable image scanner 10 in such a way that one or both of the navigation sensor apertures 42, 44 will move off the edge of the document 16. The location and spacing of the navigation sensor apertures 42 and 44 also minimizes the chances that one or both of the apertures 42, 44 will pass over a non-navigable artifact in the document 16, such as one or more of the holes 72 which may allow the document 16 to be attached to a three-ring binder.

Yet another advantage associated with the present invention is that arrangement of the first and second navigation sensor apertures 42 and 44 allows the elongate slot 38, thus scan line 58, to extend nearly to the opposite ends of the contact surface 36 of the image head 24. This geometry provides the user with a more intuitive feel for the locations of the ends of the scan line 58, thereby reducing the likelihood that the user will fail to scan to the edge of the document 16 being scanned. The more intuitive feel as to the bounds of the scan line 58 also makes it easier for the user to provide a satisfactory degree of overlap on the various scanning swipes.

Having briefly described the portable image scanner 10 according to the present invention, as well as some of its more significant features and advantages, the various embodiments of the portable image scanner 10 will now be described in detail. However, before proceeding with the description, it should be noted that while the portable image scanner 10 is shown and described herein as it may be used to scan an object 14, such as a document 16 with written text 18 thereon, it is not limited to use with any particular type of object 14. Indeed, the portable image scanner 10 may be used to scan almost any type of object imaginable. Also, it is possible to move the portable image scanner 10 over the object 14 being scanned in essentially an infinite number of varying meandering or curvilinear scanning paths. Consequently, the present invention should not be regarded as limited to being moved over the particular meandering scanning path 20 shown and described herein.

With the foregoing considerations in mind, one preferred embodiment of a portable image scanner 10 is shown in FIG. 1 as it may be used to scan an object 14, such as a document 16 with written text 18 thereon. The portable image scanner 10 may be provided with a navigation system 12 which produces a navigation signal (not shown) indicative of the position of the portable image scanner 10 with respect to the object 14 being scanned. The navigation system 12 allows the portable image scanner 10 to scan an object 14 of nearly any size by merely moving the portable image scanner 10 along a meandering or curvilinear scanning path 20 so that the scanner 10 passes over substantially the entirety of the portion of the object 14 that is to be scanned. The meandering path 20 may be thought of as defining a plurality of scanning "swipes." Image data (not shown) collected by the portable image scanner 10 during each of the scanning swipes thereafter may be stitched together by an image processor (not shown) with the aid of navigation data provided by the navigation system 12 to provide image data representative of the entirety of the scanned object 14.

Referring now to FIGS. 2–4, the portable image scanner 10 may include a main body portion 22 and an image head portion 24. The main body portion 22 may comprise an overall configuration or shape conducive to hand manipulation by a user (not shown), although other configurations may be used. In one preferred embodiment, the main body portion 22 may be sized to receive the various electronic components (not shown) required for the operation of the portable image scanner 10. Alternatively, some or all of the various electronic components may be located elsewhere and may be connected to the main body portion 22 by a suitable link, such as a tether (not shown). The main body portion 22 may also be provided with a display system 26 and various switching devices 28, 30, and 32 that may be required or desired for the operation of the portable image scanner 10. While the switching devices 28, 30, and 32 in one preferred embodiment are located on the front face of the main body portion 22, they may be located at any convenient position on the portable image scanner 10. The electrical power required to operate the portable image scanner 10 may be provided by a suitable electrical power source, such as a battery (not shown), that may also be contained within the main body portion 22 of portable image scanner 10. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the present invention will not be described in further detail herein.

Referring now primarily to FIGS. 3 and 4, the image head portion 24 may comprise a separate assembly that is attached to the main body portion 22. Alternatively, the image head portion 24 may comprise an integral part of the main body portion 22. In any event, the image head portion 24 may be sized to receive the image sensing system 34 and the navigation system 12. Essentially, the image sensing system 34 produces an image signal (not shown) representative of a scan line 58 (FIG. 5) on the object 14 being scanned and may comprise any of a wide variety of imaging systems now known or that may be developed in the future that are suitable for producing image data relating to portions of the object 14 being scanned. Consequently, the present invention should not be regarded as limited to any particular type of imaging system. However, by way of example, the imaging system 34 utilized in one preferred embodiment of the invention may comprise an illumination system 76 for directing light 78 onto the object 14 being scanned. The light 78 passes through the elongate slot 38 provided on the contact face 36 of image head portion 24. Accordingly, the light 78 produced by the illumination system 76 illuminates a scan region 80 on the object 14 that generally corresponds to the size and shape of the elongate slot 38. An imaging system 82 directs image light 40 reflected by the illuminated scan region 80 on the object 14 to a detector array 84. The detector array 84 produces an image signal (not shown) that is related to the image light 40.

The various components of the imaging sensing system 34 may comprise any of a wide range of components and devices that are well-known in the art. For example, in one preferred embodiment, the illumination system 76 may comprise an array of light emitting diodes (LEDs) which produce light 78 of a brightness that is sufficient to illuminate the scan region 80 on the object 14 being scanned. Alternatively, other types of light sources, such as incandescent or fluorescent light sources, could also be used. It is preferred, but not required, that the imaging system 82 used to direct and focus the image light 40 onto the surface of the detector 84 comprise a contact image sensor, such as a contact image sensor of the type sold under the name SELFOC which is a registered trademark of the Nippon Sheet Glass Company, Limited. Alternatively, other types of imaging systems, such as projection imaging systems, could also be used. The detector 84 may comprise a CCD array having a resolution of 300 dpi (dots per inch), such as type TS105, available from Texas Instruments, Inc. of Austin, Tex. Alternatively, other types of detectors having other resolutions could also be used.

The navigation system 12 may also be housed within the image head portion 24 of the portable image scanner 10. In one preferred embodiment, the navigation system 12 may comprise a navigation system of the type shown and described in U.S. Pat. No. 5,578,813, which has been incorporated herein by reference. Essentially, the navigation system 12 may comprise first and second navigation sensors 48 and 50 which view or monitor corresponding first and second navigation areas (e.g. navigation area 88 (FIG. 4)) via respective first and second navigation sensor apertures 42 and 44 (FIG. 3). Since each navigation sensor 48 and 50 is essentially identical, only the first navigation sensor 48 will be described herein.

Referring now primarily to FIG. 4, the first navigation sensor 48 may comprise a light source 86 for illuminating a navigation area 88 defined by the first navigation sensor aperture 42. A lens 90 focuses navigation light 46 reflected by the illuminated navigation area 88 onto the surface of a two-dimensional detector array 92. The two-dimensional detector array 92 produces a first navigation data signal related to the navigation light 46. Essentially, then, the two-dimensional detector array 92 is responsive to inherent structural features on the object being scanned. As used herein, the term "inherent structural features" refers to those features of the object 14 being scanned that are characteristic of the object 14 and are independent of forming image data and/or systematic registration data on the object 14. For example, if the object 14 being scanned comprises a paper document 16, the inherent structural features of interest may be paper fibers. As another example, if the object comprises a glossy document or an overhead transparency film, then the inherent structural features of interest may comprise specular reflection fields produced by the illuminated navigation area 88. In any event, the navigation data signal (not shown) produced by the two-dimensional detector 92 is related to inherent structural features of the object 14.

The various components just described that comprise the navigation system 12 may comprise any of a wide range of components shown and described in U.S. Pat. No. 5,578,813, referred to above. For example, in one preferred embodiment, the light source 86 may comprise a light emitting diode positioned so that light produced thereby is incident on the object at a "grazing" angle which may be in the range of about 5 degrees to about 30 degrees (the grazing angle is the complement of the angle of incidence). Alternatively, the light could be incident at substantially normal angles if specular fields are to be detected.

The two-dimensional detector array 92 may comprise a two-dimensional CCD array having dimensions of 48 by 48 pixels and having a resolution of about 600 dpi. Alternatively, arrays having different sizes and/or resolutions could also be used. However, since the navigation system and method for detecting and processing navigation data relating to the inherent structural features contained on the object 14 being scanned are described in great detail in U.S. Pat. No. 5,578,813, and since the details associated with the foregoing devices and processes are not required to understand or practice the present invention, the navigation system 12 and method for detecting and processing navigation data that may be used in one preferred embodiment of the invention will not be described in further detail herein.

As was described above, the spacing and positioning of the navigation areas (e.g., navigation area 88) detected by the navigation sensors 48 and 50 are important in achieving the objects and advantages associated with the present invention. More specifically, it is important that the navigation areas be located at positions other than positions that are aligned with the first and second lengthwise ends 52 and 54 of the elongate slot 38 (e.g., scan line 58). For example, in the embodiment shown in FIG. 3, the navigation sensor apertures 42 and 44 are laterally displaced from the axis 56 connecting the first and second lengthwise ends 52 and 54 of the elongate slot 38 by a distance W. The navigation sensor apertures 42 and 44 are also separated by a spaced-distance D that is generally less than the length L of the elongate scan line 58 (FIG. 5) defined by the elongate slot 38. Accordingly, unlike the configuration shown and described in U.S. Pat. No. 5,578,813, the navigation sensing areas (e.g., sensing area 88) monitored by the first and second navigation sensors 48 and 50 in the present invention are not located at positions that are generally aligned with the first and second lengthwise ends 52 and 54 of the elongate slot 38.

The first and second navigation sensors 48 and 50 in one preferred embodiment are essentially aligned with the first and second apertures 42 and 44. See FIG. 4. Consequently, the first and second navigation sensors 48 and 50 may be thought of as being positioned at approximately the same locations as the first and second apertures 42 and 44, respectively, at least with regard to the spaced-distance D and the lateral distance W. However, this need not necessarily be the case. For example, if an optical coupling system (e.g., a fiber optic light transmission system, a light pipe, or a mirror system) is used to transmit navigation light 46 to the various navigation sensors 48 and 50, then the first and second navigation sensors 48 and 50 may be placed at any convenient location within the image head 24 or may even be placed within the main body portion 22 of the portable image scanner 10. Consequently, it should be remembered that it is the locations of the navigation sensing areas (e.g., area 88) which, in one embodiment are defined by the first and second apertures 42 and 44, that are important in achieving the objects and advantages of the present invention, and not the locations of the actual sensors 48 and 50, which may be located almost anywhere, particularly if an optical coupling system is used.

The method 60 for determining the spaced-distance D separating the navigation sensors 48 and 50 (i.e., the first and second navigation areas) is best understood by referring to FIGS. 5 and 6. FIG. 5 is a schematic representation of the scan line 58 that is "sensed" or detected by the imaging system 34 contained in the image head 24. The scan line 58 has a length L that is essentially identical to the length L of the elongate slot 38 in the contact face 36 of the image head 24. It should be remembered, however, that in most practical applications, the length of the elongate slot 38 will be slightly longer than the length L of the scan line 58 to ensure that the entirety of the scan line L is detected by the imaging system 34. Accordingly, as used herein the length L refers to the length of the scan line 58, as opposed to the length of the elongate slot 38 which may be somewhat longer. Also, for convenience in explaining the method 60 of determining the spaced-distance D separating the navigation sensors 48 and 50, the first and second navigation sensors 48 and 50 may be considered as being located at respective positions 48' and 50' on scan line 58, as shown in FIG. 5. However, in practice, the first and second navigation sensors 48 and 50 are displaced from the scan line 58 by a lateral distance W (FIG. 3).

Before continuing with the detailed description of the method 60 for determining the spaced-distance D, it is useful to briefly explain some of the details relating to how the image processing system (not shown) uses the navigation data to correlate the image data collected on the various swipes. While the details are fully described in U.S. Pat. No. 5,578,813, referred to above and incorporated herein by reference, they are summarized below for convenience.

In one preferred embodiment, the navigation data provided by the navigation system 12 may comprise rectilinear (e.g., x-y) position data indicative of the positions of the two navigation areas (e.g., area 88) sensed by the respective navigation sensors 48 and 50. Since the positions of the two navigation areas are known (and fixed) with respect to the elongate scan line 58, the navigation data is also indicative of the location of the elongate scan line 58 with respect to the object 14 being scanned. Accordingly, the image processing system (not shown) may use the navigation data to fit together the various image data portions collected by the image sensing system 34 to form unified image data representative of the entirety of the scanned object 14.

In one implementation, each navigation sensor 48, 50 is sampled at periodic intervals referred to herein as sampling intervals. Stated another way, a "picture" or sample frame is taken of the inherent structural features of the object 14 once every sampling interval. A navigation system (not shown) correlates each sample frame to produce a map or history of the movement of the portable image scanner 10 over the object 14. The frame-to-frame correlations are referred to herein as "microsteps." Put in other words, a microstep is the distance that the portable image scanner 10 moves between two consecutive sample frames.

It is generally preferred that the sampling interval dt be made sufficiently short so that there is considerable overlap between two consecutive sample frames for the highest expected scanner translation speed. In one embodiment, it is preferred that a microstep should be no larger than about one (1) pixel (e.g., a 600 dpi pixel if that is the resolution of the two dimensional navigation sensor array). Alternatively, microsteps having other lengths may also be used. By way of example, if the maximum expected scanning speed is about 53 cm/sec and the length of a microstep is about one (1) 600 dpi pixel (about 0.042333 mm), then the sampling interval dt should be about 80 $\mu$s or so. Alternatively, of course, other sampling intervals dt may be used.

As is discussed in the foregoing U.S. Patent, it is generally preferred that "random walk" error be reduced by storing a sample frame in a separate memory location for use in a subsequent series of correlation computations. This latter correlation is referred to herein as a "macrostep." By using macrosteps, a more precise determination of scanner displacement across a distance of m image frame displacements (i.e., m microsteps) can be obtained. In one preferred embodiment, a macrostep comprises 12 microsteps, although a greater or fewer number of microsteps could be used. In the example described herein, a macrostep comprises twelve (12) 600 dpi pixels or about 0.508 mm.

The navigation data may be used to clock the image sensing system 34 to generate a scan line of image data at periodic intervals. Each time the image sensing system 34 is clocked, the image data produced thereby is tagged with the corresponding navigation data to form position tagged image data. The position tagged image data from different image swipes may be thereafter stitched together using the navigation data attached thereto to make the necessary correlations. However, some overlap of the image data from consecutive swipes is necessary, since the navigation correction is calculated by correlating features within the overlapping areas. The overlapping areas comprise rectangular image segments and are referred to herein as registration tiles 94. See FIG. 5. A registration tile 94 may be thought of as existing at each end of the elongate scan line 58, although only one registration tile 94 is shown in FIG. 5.

Consider, for example, a situation involving a registration tile 94 obtained on a first swipe. Image data collected on a second swipe may also be provided with a registration tile 94'. If the navigation data were perfect, there would be no offset between the first registration tile 94 and the second registration tile 94'. That is, the second registration tile 94' would be perfectly aligned with the first registration tile 94. More realistically, however, some navigation error will have accumulated since the last registration was performed which will cause the second registration tile 94 to be offset or displaced somewhat with regard to the first registration tile 94. This condition is illustrated in FIG. 5. The offset between the first and second registration tiles 94 and 94' may be used to produce a correlation factor which may then be used to update future navigation position tags in order to minimize the total accumulated error. In this way, the total accumulated error in the navigation data is prevented from growing so large that it introduces an obvious distortion in the region of the swipe overlap.

Generally speaking, it is desired to limit the amount of offset that is allowed to produce the correlation factor for two registration tiles (e.g., 94 and 94'). A first reason for limiting the amount of offset relates to the processing speed and capacity of the navigation processing system. That is, the greater the offset that is allowed to be correlated, the greater the number of calculations that may be required before the correlation is found. A second reason for limiting the offset is that large navigation offsets may result in "false correlations," i.e., a correlation being found where there is no correlation in fact. Consequently, a maximum navigation offset value should be selected that is commensurate with the foregoing considerations. In one preferred embodiment, the maximum navigation offset value is selected to be ten (10) 600 dpi pixels (i.e., about 0.4233 mm). In another embodiment, the maximum navigation offset value may be selected to be eighteen (18) 600 dpi pixels (i.e., about 0.762 mm). Alternatively, other maximum navigation offset values may be used.

The maximum navigation offset may be thought of as defining an area or region 64 that is slightly larger than the registration tile 94. Then, if the second registration tile 94' is contained within the region 64, then the offset will be less than or equal to the maximum navigation offset value. The region 64 is larger than the registration tile 94 in the x- and y-directions by the maximum navigation offset value. That is, if the maximum navigation offset is selected to be about ten (10) 600 dpi pixels, then the region 64 is larger than the registration tile 94 in the x-direction by 10 pixels and also in the y-direction by 10 pixels.

Proceeding now with the description, the first step 62 in the method 60 for determining the spaced-distance D is to select the maximum navigation offset value described above. The maximum navigation offset may be expressed in units of pixels, although conventional length units (e.g., millimeters, microns, etc.) may also be used. As mentioned above, in one preferred embodiment, the maximum navigation offset may be selected to be about ten (10) 600 dpi pixels or about 0.4233 mm. In an alternative embodiment, the maximum navigation offset may be about eighteen (18) 600 dpi pixels or 0.762 mm.

The next step 66 in the method 60 is to determine a radius R of a navigation error circle 68 associated with each navigation sensor 48 and 50. Essentially, the navigation error circle 68 represents the position error likely to be expected based on a predetermined displacement of the portable image scanner 10 across the object 14. The radius R of the navigation error circle 68 may be in units of pixels, although conventional length units may also be used.

The radius R of the navigation error circle 68 may be determined as follows. Generally speaking, turning around the portable image scanner 10 at the end of the document 16 and re-locating the registration tiles 94 is the most challenging part of the navigation process. In the example shown and described herein, the total length of this movement may be estimated to be about 15.2 cm (12.7 cm over and 2.5 cm up), although other lengths are possible depending on the particular environment in which the portable image scanner 10 is expected to be used. The estimated length set forth above corresponds to 3600 microsteps or 300 macrosteps (if there are 12 microsteps per macrostep).

The radius R of the navigation error circle 68 may be calculated by multiplying the square root of the number of macrosteps in the longest expected movement by the error likely to occur with each macrostep. By way of example, assuming and expected movement of about 300 macrosteps and a nominal error of about ¼ pixel (600 dpi, or about 0.011 mm) per macrostep, the radius R of the navigation error circle 68 in one preferred embodiment is approximately ($\sqrt{300}$)(¼ pixel) or about 4.33 pixels (600 dpi) or about 0.183 mm.

Having determined the maximum navigation offset and the radius R of the navigation error circle 68, the spaced-distance D separating the two navigation sensors 48 and 50 is then calculated at step 70. Essentially, the spaced-distance D should be selected so that it is about equal to or greater than the product of the length L of the elongate scan line 58 and the radius R of the navigation error circle 68 divided by the maximum navigation offset. Expressed mathematically:

$$D \geq \frac{LR}{\text{Max. Navigation Offset Value}}$$

By way of example, in one preferred embodiment wherein the length L of the elongate scan line 58 is about 127 mm, the spaced-distance D should be greater than or equal to [(127)(4.33)]/10 or about 55 mm. This represents the minimum spaced-distance D that should separate the two navigation position sensors 48 and 50 (actually the distance separating the navigation areas (e.g., 88) sensed by the navigation position sensors 48 and 50). It is generally preferred, but not required, that the first and second navigation position sensors 48 and 50 be centered about the center point 74 of the scan line 58, as best seen in FIG. 5.

Another consideration in locating the first and second navigation sensors 48 and 50 relates to the positions of any "non-navigable" artifacts that may be expected to present on the object 14 to be scanned. For example, if the object 14 most likely to be encountered comprises a document 16 having a plurality of holes 72 contained in the left-hand margin, such as the type commonly used to allow the document 16 to be held by a 3-ring binder, then it is preferable that the navigation sensors 48 and 50 be located so that they are not likely to pass over such holes 72 during normally expected scanning swipes. In accordance with this consideration, it was found that the minimum spaced-distance D could be increased in one preferred embodiment from the calculated value of 55 mm to about 76 mm. This increased spaced-distance D is generally increases the accuracy of the position tagged image data while at the same time being sufficient to locate the first and second navigation sensors 48 and 50 at positions not likely to pass over such holes 72 even if the user sweeps the portable image scanner 10 along a path 20 that makes about a 45° angle with the long edge 96 of the document 16. See FIG. 1.

The two navigation sensors 48 and 50 may also be displaced laterally from the central axis 56 of scan line 58 by a lateral spacing W, as best seen in FIG. 3. The lateral spacing W may be any of a wide range of values, keeping in mind that larger lateral spacings W will tend to adversely affect the accuracy of the position tagged image data. Accordingly, it is generally preferred that the lateral spacing W be kept as small as possible. By way of example, in one preferred embodiment, the lateral spacing W is about 8 mm.

The portable image scanner 10 may be operated as follows to scan an object 14, such as a document 16 with written text 18 thereon. As a first step, the user (not shown) would set-up or initialize the portable image scanner 10 to perform the scanning operation by actuating the appropriate switches (e.g., 28, 30, and 32) in accordance with the particular operational sequence for the specific scanner device 10. The user may then place the contact surface or face 36 of the scanner 10 against the document 16 and initiate the scanning operation. In order to capture the entire contents of the document 16, the user may deem it necessary to move the portable image scanner 10 over the document 16 in a meandering or curvilinear scanning path 20. The meandering or curvilinear scanning path 20 may define one or more scanning "swipes." The image data produced by the imaging sensing system 34 on each of the scanning swipes may be "tagged" with corresponding navigation data to produce positioned tagged image data. The position tagged image data may thereafter be stitched together by the image processing system (not shown) to form combined image data representative of the entirety of the scanned document 16. However, since the processes of correlating the image and navigation data to stitch together the image data are discussed, at length, in U.S. Pat. No. 5,578,813, the correlating and stitching processes that may be utilized in one preferred embodiment of the present invention will not be described in further detail herein.

It is contemplated that the inventive concepts herein described may be variously otherwise embodied and it is intended that the appended claims be construed to include alternative embodiments of the invention except insofar as limited by the prior art.

What is claimed is:

1. An imaging device, comprising:

an image head having an elongate slot therein having first and second lengthwise ends, said image head also including a first aperture and a second aperture positioned adjacent the elongate slot at positions other than positions that are aligned with the first and second lengthwise ends of the elongate slot;

an image sensing system responsive to image light reflected by an object being scanned and producing an image signal based on the image light, said image sensing system being optically coupled to the elongate slot in said image head so that image light passing through the elongate slot is received by said image sensing system;

a first navigation sensor responsive to first navigation light reflected by the object being scanned and producing a first navigation data signal based on the first navigation light, said first navigation sensor being optically coupled to the first aperture in said image head so that first navigation light passing through the first aperture is received by said first navigation sensor; and a second navigation sensor responsive to second navigation light reflected by the object being scanned and producing a second navigation data signal based on the second navigation light, said second navigation sensor being optically coupled to the second aperture in said image head so that second navigation light passing through the second aperture is received by said second navigation sensor.

2. The imaging device of claim 1, wherein the first and second apertures in said image head are positioned a spaced-distance apart, the spaced-distance being less than a distance separating the first and second lengthwise ends of the elongate slot in said image head.

3. The imaging device of claim 2, wherein said image sensing system comprises a contact image sensor having a length extending substantially between the first and second lengthwise ends of the elongate slot in said image head.

4. The imaging device of claim 3, wherein each of said first and second navigation sensors comprise:

an illumination system for directing light onto the object being scanned;

a two dimensional array of optical sensor elements; and a focusing system positioned between said two dimensional array of optical sensor elements and the object for collecting and focusing light reflected by the object being scanned onto said two dimensional array of optical sensor elements.

5. The imaging device of claim 4, further comprising a processing system operatively associated with said image sensing system, said first navigation sensor, and said second navigation sensor, said processing system being responsive to the image signal and to the first and second navigation data signals, said processing system transforming said image signal based upon relative movement between said image sensing system and the object being scanned as determined by the first and second navigation data signals produced by said first and second navigation sensors to produce a transformed image data signal.

6. The imaging device of claim 5, wherein the first and second navigation light reflected by the object being scanned includes information relating to inherent structural features on the object being scanned.

7. The imaging device of claim 6, wherein the length of the contact image sensor is about 127 mm and wherein the spaced-distance separating the first and second apertures is about 76 mm.

8. The imaging device of claim 7, wherein the first and second apertures are laterally displaced from the elongate slot by a distance of about 8 mm.

9. A method for determining a spaced-distance separating a first navigation area and a second navigation area based on a length of an elongate scan line, comprising the steps of:

selecting a maximum navigation offset;

determining a radius of a navigation error circle associated with the first navigation area; and selecting the spaced-distance separating the first and second navigation areas to be about equal to or greater than the product of the length of the elongate scan line and the radius of the navigation error circle divided by the maximum navigation offset.

10. An imaging device, comprising:

a generally elongate image sensing system having first and second lengthwise ends, said generally elongate image sensing system being responsive to image light reflected by an object being scanned and producing an image signal based on the image light;

a navigation sensor positioned a spaced-distance from said generally elongate image sensing system at a position other than positions adjacent and aligned with the first and second lengthwise ends of said generally elongate image sensing system, said navigation sensor producing a navigation signal indicative of the position of said generally elongate image sensing system with respect to the object being scanned; and a processing system operatively associated with said generally elongate image sensing system and said navigation sensor and responsive to the image signal and the navigation signal, said processing system transforming said image signal based upon relative movement between said generally elongate image sensing system and the object being scanned as determined by the navigation signal produced by said navigation sensor to produce a transformed image data signal.

11. The imaging device of claim 10, wherein said navigation sensor comprises a first navigation sensor portion and a second navigation sensor portion, said first and second navigation sensor portions being positioned a spaced-distance apart at respective first and second positions adjacent said generally elongate image sensing system.

12. The imaging device of claim 11, wherein said first and second navigation sensor portions comprise optical sensors responsive to structural features on the object being scanned.

13. The imaging device of claim 12, wherein each of said optical sensors that comprise said first and second navigation sensor portions comprises:

an illumination system for directing light onto the object being scanned;

a two dimensional array of optical sensor elements; and a focusing system positioned between said two dimensional array of optical sensor elements and the object for collecting and focusing light reflected by the object being scanned onto said two dimensional array of optical sensor elements.

14. The imaging device of claim 13, wherein said generally elongate image sensing system comprises a contact image sensor having a length extending substantially between the first and second lengthwise ends of said generally elongate image sensing system.

15. The image device of claim 14, wherein said first and second navigation sensor portions are separated by a spaced-distance that is less than the length of said contact image sensor.

* * * * *